United States Patent
Kuo et al.

(10) Patent No.: US 10,054,713 B2
(45) Date of Patent: Aug. 21, 2018

(54) ACOUSTO-ELECTROMAGNETIC MEASUREMENT THROUGH USE OF DOPPLER SPECTRUM FOR CASING CORROSION EVALUATION

(71) Applicant: Halliburton Energy Services, Inc., Houston, TX (US)

(72) Inventors: Chih-Hao Kuo, Singapore (SG); Rencheng Song, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 146 days.

(21) Appl. No.: 15/300,193

(22) PCT Filed: Dec. 2, 2015

(86) PCT No.: PCT/US2015/063387
§ 371 (c)(1),
(2) Date: Sep. 28, 2016

(87) PCT Pub. No.: WO2017/095402
PCT Pub. Date: Jun. 8, 2017

(65) Prior Publication Data
US 2018/0017707 A1   Jan. 18, 2018

(51) Int. Cl.
*G01V 1/50* (2006.01)
*E21B 49/00* (2006.01)
(Continued)

(52) U.S. Cl.
CPC .............. *G01V 11/00* (2013.01); *E21B 49/00* (2013.01); *G01V 1/50* (2013.01); *G01V 3/30* (2013.01)

(58) Field of Classification Search
CPC ............. G01V 1/50; G01V 3/30; G01V 11/00
See application file for complete search history.

(56) References Cited

U.S. PATENT DOCUMENTS

| 4,701,892 A | 10/1987 | Anderson |
| 4,947,683 A | 8/1990 | Minear et al. |

(Continued)

FOREIGN PATENT DOCUMENTS

| WO | 2011042413 A1 | 4/2011 |
| WO | 2014189497 A1 | 11/2014 |

(Continued)

OTHER PUBLICATIONS

Lawrence et al., Acoustic and Electromagnetic Wave Interaction: Analytical Formulation for Acousto-Electromagnetic Scattering Behavior of a Dielectric Cylinder, IEEE Transactions on Antennas and Propagation, vol. 49, No. 10, Oct. 2001, pp. 1382-1392.

(Continued)

*Primary Examiner* — Krystine E Breier
(74) *Attorney, Agent, or Firm* — McDermott Will & Emery LLP

(57) ABSTRACT

A method includes introducing a tool into a wellbore lined at least partially with a first casing and a second casing concentrically overlapping a portion of the first casing emitting an acoustic wave from an acoustic source included in the tool causing the first and second casings to vibrate at their respective resonant frequencies, emitting high frequency electromagnetic (EM) energy using the tool that interacts with the first casing to generate a first EM scattered field, emitting low frequency EM energy using the tool, at least a portion of the low frequency EM energy traversing the first casing and interacting with the second casing to generate a second EM scattered field, and analyzing the first and second EM scattered fields to determine a presence of corrosion in at least one of the first and second casings.

24 Claims, 7 Drawing Sheets

(51) Int. Cl.
    *G01V 11/00*     (2006.01)
    *G01V 3/30*     (2006.01)

(56) References Cited

U.S. PATENT DOCUMENTS

| | | |
|---|---|---|
| 6,597,178 B1 | 7/2003 | Nichols et al. |
| 6,759,968 B2 | 7/2004 | Zierolf |
| 7,308,941 B2 | 12/2007 | Rolovic et al. |
| 7,598,898 B1 | 10/2009 | Funk et al. |
| 7,681,450 B2 | 3/2010 | Bolshakov et al. |
| 7,793,722 B2 | 9/2010 | Vinegar et al. |
| 7,937,248 B2 | 5/2011 | Ihn et al. |
| 2010/0095757 A1 | 4/2010 | Hansen |
| 2013/0147316 A1 | 6/2013 | Matam et al. |
| 2016/0069842 A1* | 3/2016 | Bonavides ........... G01N 29/225 73/152.03 |
| 2017/0350231 A1* | 12/2017 | Merciu ............... E21B 47/0005 |

FOREIGN PATENT DOCUMENTS

| | | |
|---|---|---|
| WO | 2014193382 A1 | 12/2014 |
| WO | 2015023386 A1 | 2/2015 |

OTHER PUBLICATIONS

Sarabandi et al., Acoustic and Electromagnetic Wave Interaction: Estimation of Doppler Spectrum From an Acoustically Vibrated Metallic Circular Cylinder, IEEE Transactions on Antennas and Propagation, vol. 51, No. 7, Jul. 2003, pp. 1499-1507.

Montaldo et al., Real Time Inverse Filter Focusing Through Iterative Time Reversal, WCU 2003, Paris, Sep. 7-10, 2003, pp. 867-870.

Montaldo et al., Real Time Inverse Filter Focusing Through Iterative Time Reversal, J. Acoust. Soc. Am. 115 (2), Feb. 2004, pp. 768-775.

Buerkle, Amelia Marie, Modeling and Applications of Acoustic and Electromagnetic Wave Interaction, A dissertation submitted in partial fulfillment of the requirements for the degree of Doctor of Philosophy, The University of Michigan, 2007.

Buerkle et al., Analysis of Acousto-Electromagnetic Wave Interaction Using Sheet Boundary Conditions and the Finite-Difference Time-Domain Method, The University of Michigan, dated before Jan. 24, 2014.

ISR/WO for PCT/US2015/063387 dated Sep. 2, 2016.

* cited by examiner

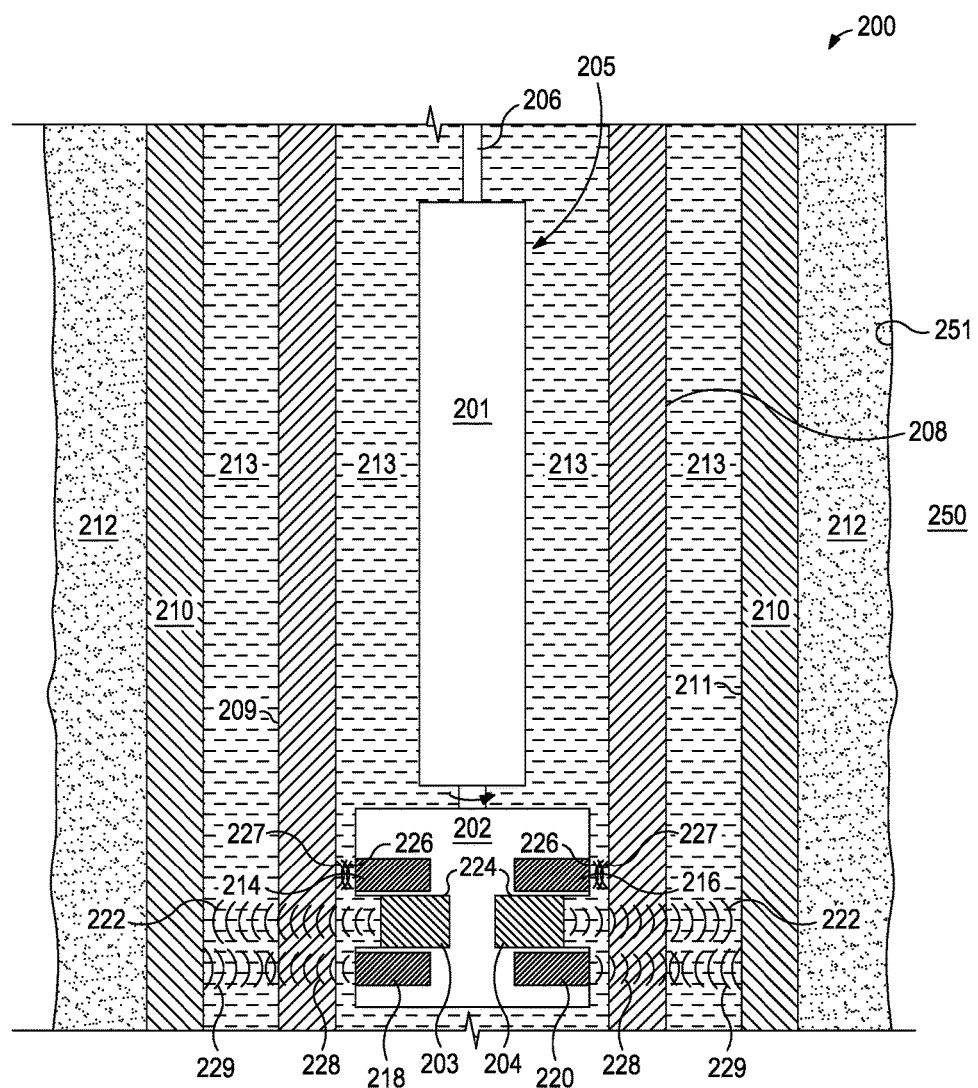

ACOUSTO-ELECTROMAGNETIC MEASUREMENT THROUGH USE OF DOPPLER SPECTRUM FOR CASING CORROSION EVALUATION

BACKGROUND

During drilling and production operations, it may be necessary to inspect the structural integrity of casing that lines a wellbore. Casing integrity can be checked by imaging the casing to detect defects such as corrosion, and remedial measures can be taken before the casing is damaged because of these defects. Typically, the imaging is carried out using electromagnetic or acoustic systems.

An electromagnetic high frequency system, however, does not have good detecting capability when probing the interior of the casing or beyond a casing or tubing liner because the material of the casing (e.g., steel) is too lossy for electromagnetic (EM) waves to penetrate deep into the casing. A low-frequency EM system may afford enough penetration capability, but the resolution is low and the system is not sensitive enough to small changes in the structure of the casing due to corrosion.

In some cases, an acoustic system is used instead of an electromagnetic system since the acoustic system offers high image resolution. However, acoustic measurements from an acoustic system are easily deteriorated due to background mechanical vibration. The coupling of acoustic energy into the target is also difficult if the acoustic impedance mismatch is large. As a result, a major portion of the incident acoustic energy is reflected from the target boundary and only a small amount of the incident acoustic energy penetrates into the interior of the target.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 2 illustrates an example inspection system.

DETAILED DESCRIPTION

The present disclosure relates generally to downhole detection techniques and, more particularly, to systems and methods for corrosion detection in wellbore casings using acousto-electromagnetic measurements.

The embodiments provided herein describe acousto-electromagnetic (EM) systems used to monitor the integrity of casings that line a wellbore. Compared to an all-electromagnetic or an all-acoustic system, an acousto-EM system has much higher sensitivity to the interior of a target (casing) due to the boundary displacement or shape perturbation occurring on and within the target due to vibration of the target at its resonant frequency. Measurements using an acousto-EM system contain additional information about the target, which aids in corrosion evaluation.

Acousto-EM wave interaction occurs when an EM wave scatters from a metallic casing under acoustic excitation. The acoustic excitation causes mechanical vibration of the casing, resulting in a scattered EM field including a Doppler component shifted in frequency by the acoustic frequency of vibration of the casing. The scattered EM field has an improved sensitivity to flaws, such as corrosion present in the casing. The acousto-EM measurements are processed through time-reversal focusing (TRF) to estimate the location and severity of casing corrosion. One of the advantages of the present disclosure over the prior art is enhanced measurement sensitivity to casing corrosion and high imaging resolution, which may result in early detection and evaluation of corrosion casing. The proposed systems enable non-destructive measurement and characterization of casing corrosion without having to pull the casing to the surface for analysis, and thus saves time and operational costs.

Figure 1A:
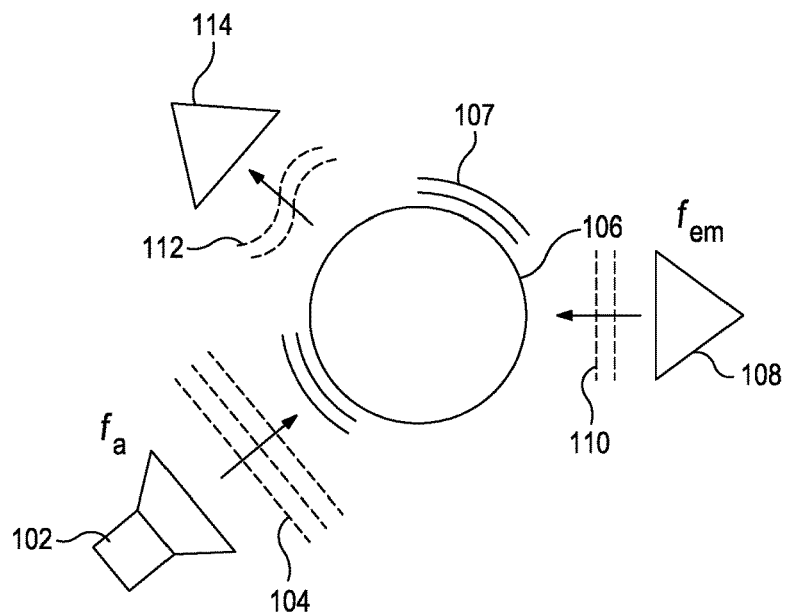
FIG. 1A illustrates an exemplary acousto-electromagnetic wave interaction.

FIG. 1A illustrates an exemplary acousto-EM wave interaction, which occurs when an electromagnetic wave scatters from an object under acoustic (or seismic) vibration. As illustrated, an acoustic source 102 generates an acoustic wave (or field) 104 at a frequency $f_a$ that is incident on an object 106. The incident acoustic wave 104 causes boundary displacement and density modulation on and within the object 106, thereby resulting in vibration 107. An EM source 108 is also depicted as generating an EM wave (or field) 110 at a frequency $f_{EM}$, which is also incident on the object 106. Due to the vibration 107 of the object 106, a frequency modulated electromagnetic scattered field 112 may be generated and is detectable by a receiver 114. It should be noted that, although FIG. 1A illustrates the acoustic wave 104 being incident on the exterior of the object 106, similar phenomena is observed when the acoustic wave 104 is incident on an interior of an object, such as a wellbore casing, as described below.

Figure 1B:
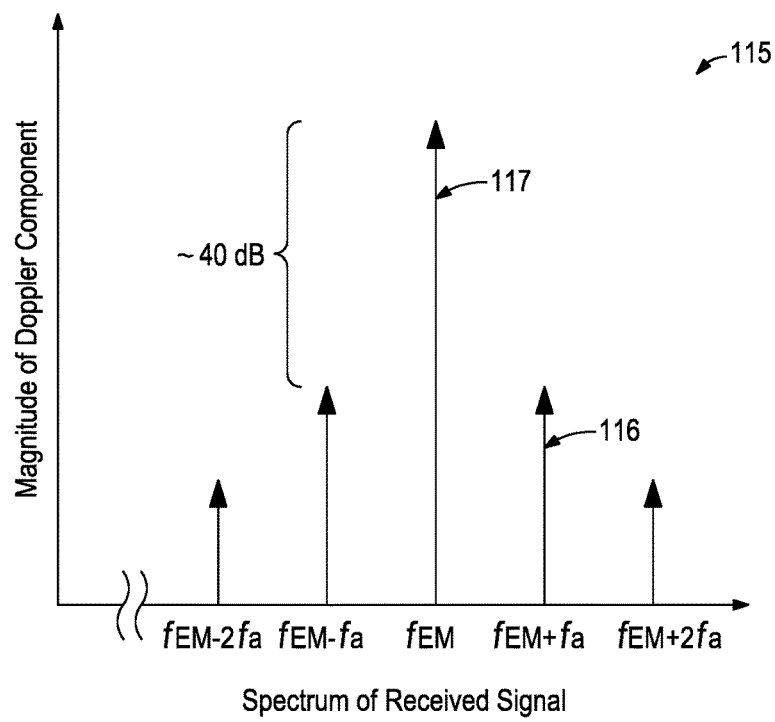
FIG. 1B illustrates a spectrum of a scattered electromagnetic scattered field in FIG. 1A.

FIG. 1B illustrates a spectrum 115 of the electromagnetic scattered field 112 of FIG. 1A. As illustrated in FIG. 1B, the spectrum 115 of the electromagnetic scattered field 112 contains both the unshifted frequency component $f_{EM}$ and a Doppler component 116 shifted in frequency by the acoustic frequency $f_a$. The magnitude of the Doppler component 116 is less than the magnitude of the unshifted component $f_{EM}$ by around 40 dB. The frequency of the Doppler component can be approximately represented as $\Delta f \approx \Delta v/c\, f_0$, where $\Delta v$ is the velocity of EM receiver 114 relative to EM source 108 ($\Delta v$ is generated due to vibration of the object 106, and the object 106 is assumed to vibrate at its acoustical resonant frequency which maximizes $\Delta v$), $f_0$ is the frequency of the emitted EM wave 110 and c is the speed of the EM wave 110. The Doppler component 116 depends on both the object physical parameters (density, dielectric contrast from background, geometry, shear modulus, etc.) and electromagnetic and acoustic source parameters (acoustic frequency, acoustic power, electromagnetic frequency, and electromagnetic polarization). At resonant acoustic frequencies, determined by the density contrast between the object 106 and the background and mechanical properties of the object 106, the boundary and density modulations are enhanced and the Doppler component 116 having the largest value is obtained.

As described in more detail below, the presence of any defect, in the object, such as corrosion, causes a shift in the Doppler component 116 and results in a perturbed Doppler component. Based on the Doppler component 116 and the perturbed Doppler component, a location of the defect can be determined.

FIG. 2 illustrates an example inspection system 200 for inspecting one or more casings lining a wellbore 251 drilled through a formation 250. The inspection system 200 may comprise a downhole tool 205 suspended in the wellbore 251 via a conveyance 206, such as wireline or slickline, which may be in communication with a processing unit (not shown) located on the surface. The wellbore 251 may be lined with an inner casing 208 concentrically arranged within an outer casing 210. The outer casing 210 may be bonded to the wellbore 251 via cement 212. As used herein, the term "casing" refers to tubular pipes or conduits that may be connected end to end to form a continuous fluid conduit. In some embodiments, the casings 208, 210 may be production casings and may be used to produce fluid 213, such as wellbore fluid or formation fluid, to the surface. However, as would be appreciated by one of ordinary skill in the art, the inner and outer casings 208, 210 can also include other types of casings, such as liner or coiled tubing.

The downhole tool 205 may include a stationary portion 201 and a rotating portion 202. The rotating portion 202 may be used, for example, when azimuthal resolution of the wellbore 251 required. The stationary portion 201 may include instrumentation and electronics for controlling the rotating portion 202 and communicating with the processing unit located on the surface. The rotating portion 202 may be or include a scanning head on which are mounted acoustic sources 203 and 204, high frequency EM energy transmitters/receivers (transceivers) 214 and 216, and low frequency EM energy transceivers 218 and 220. Although the acoustic sources 203, 204 and EM energy transceivers 214, 216, 218, and 220 are shown coupled to the rotating portion 202, in other embodiments, one or more of the acoustic sources 203, 204 and EM energy transceivers 214, 216, 218, and 220 may be disposed on the stationary portion of 201 of the tool 205, without departing from the scope of the disclosure.

Although not illustrated for simplification, a servicing rig, such as a drilling rig, a completion rig, a workover rig, other mast structure, or a combination of these may be located on the surface at the top of the wellbore 251. In some embodiments, the servicing rig may include a derrick with a rig floor. In subsea operations, piers extending downwards to a seabed in some implementations may support the servicing rig. Alternatively, the servicing rig may be supported by columns sitting on hulls or pontoons (or both) that are ballasted below the water surface, which may be referred to as a semi-submersible platform or rig. In an off-shore location, a riser may extend from the servicing rig to exclude sea water and contain drilling fluid returns. There may also be a wellhead present on top of the wellbore 251 at the surface. Other mechanical apparatuses that are not shown may control the run-in and withdrawal of the downhole tool 205 in the wellbore 251. Examples of these other mechanical apparatuses include a draw works coupled to a hoisting apparatus, a slickline unit or a wireline unit including a winching apparatus, another servicing vehicle, and a coiled tubing unit.

The acoustic sources 203, 204 may emit an acoustic wave 222 into the inner and outer casings 208 and 210, causing the inner and outer casings 208 and 210 to vibrate. The acoustic wave 222 may have a pre-determined frequency spectrum and, in certain embodiments, the frequency spectrum may be selected to make the casings 208 and 210 vibrate at their respective acoustic resonant frequencies. In an example, the acoustic sources 203, 204 may operate in the sonic and/or ultrasonic frequency range. In some embodiments, the acoustic sources 203, 204 may be positioned within recessed portions 224 of the rotating portion 202. The recessed portions 224 may function to focus the acoustic wave 222 radially outwards toward the inner and outer casings 208 and 210. In other embodiments, the acoustic sources 203, 204 may extend out of the tool body a short distance or they may be pad mounted, telescopically mounted, or any combination of the foregoing.

Each high frequency EM energy transceiver 214 and 216 may emit high frequency EM energy 226, which may comprise a plurality of EM pulses having a pre-determined duration and frequency (e.g., around 3 GHz). The EM energy 226, due to having high frequency, may at most be incident on the inner surface 209 of the inner casing 208 before the EM energy 226 dissipates or "dies down." The vibration of the inner casing 208 due to the acoustic wave 222 generates a scattered EM field (or wave) 227 that is received by each high frequency EM energy transceiver 214 and 216.

Each low frequency EM energy transceiver 218 and 220 may emit low frequency EM energy 228, which may comprise a plurality of EM pulses having a pre-determined duration and frequency (e.g., around 10-1000 Hz). The low energy EM energy 228 also interacts with the inner casing 208 that is under acoustic illumination due to the acoustic wave 222 and, as a result, the scattered EM field (or wave) 229 is generated. Because of its low frequency, at least a portion of the EM energy 228 may traverse the inner casing 208 and impinge upon the inner surface 211 of the outer casing 210. The vibration of the outer casing 210 due to the acoustic wave 222 also contributes to the generation of the scattered EM field (or wave) 229. The scattered EM field 229 is received by each low frequency EM energy transceiver 218 and 220. In the event the low energy EM energy 228 does not interacts with the outer casing 210, the low energy EM energy 228 would still interact with the vibrating inner casing 208 and thereby generate the scattered EM field (or wave) 229. Thus, the scattered EM field 229 may be generated either due to the vibrating inner casing 208 or due to the vibrating inner and outer casing 208, 210, and includes information regarding any corrosion present on the inner and outer casing 208, 210.

In an example, the EM energy transceivers 214, 216, 218, and 220 may comprise coil antennae, and the EM waves 226, 227, 228, and 229 may comprise a plurality of high-frequency EM pulse sequences, such as pulses in the microwave-range. In other examples, the EM energy transceivers 214, 216, 218, and 220 may comprise optical transceivers, and the EM waves 226, 227, 228, and 229 may comprise a plurality of laser or electromagnetic radiation pulses. As will be appreciated by one of ordinary skill in the art, in certain embodiments, the EM energy transceivers 214, 216, 218, and 220 may be separated into individual transmitters and receivers.

In certain embodiments, the configuration and placement of one or more EM energy transceivers 214, 216, 218, and 220 may be varied with respect to the downhole tool 205 and the acoustic sources 203, 204. For example, one or more EM energy transceivers 214, 216, 218, and 220 may be angled such that they transmit EM energy at a target area of the casings 208, 210 adjacent to the acoustic sources 203, 204. The specific angular positions of the transceivers may be optimized according to the specific implementation. In certain other embodiments, the EM energy transceivers 214, 216, 218, and 220 may be moved axially closer to or further from the acoustic sources 203, 204 to ensure accurate measurement of the vibration in the casings 208, 210 caused by the acoustic sources 203, 204. For example, in ultrasonic applications, where the vibration in inner casing 208 may occur in the vicinity of the acoustic sources 203, 204, the EM energy transceivers 214, 216 may be moved closer to the acoustic sources 203, 204. In contrast, in low frequency applications, the EM energy transceivers 218, and 220 may be spaced further from the acoustic sources 203, 204.

In operation, the rotating portion 202 may rotate the acoustic sources 203, 204 and EM energy transceivers 214, 216, 218, and 220 either while the tool 205 is stationary at a desired location in the wellbore 251 or while the tool 205 is traversing the wellbore 215 (either in the uphole or downhole directions), thereby scanning the inner and outer casings 208 and 210. In the embodiment shown, the acoustic sources 203 and 204 may transmit an acoustic wave at the inner and outer casings 208 and 210. A sequence of high and low frequency EM pulses 226, 228 may be transmitted by the respective EM energy transceivers 214, 216, 218, and 220 and the scattered EM fields 227, 229 may be received at the respective EM energy transceivers 214, 216, 218, and 220.

It should be noted that the high frequency of the EM pulses 226 results in a measurable Doppler component (e.g., Doppler component 116, FIG. 1) in the scattered EM field 227 generated due to scattering of the high frequency EM wave 226 from the inner casing 208. On the contrary, a Doppler component does not exist in the scattered EM field 229 or the Doppler component, although present, may have a relatively low magnitude and thus may not be measurable. However, the total EM scattered field 229 still includes information based on which a presence of defects such as corrosion on the outer casing 210 can be determined. However, unlike the EM scattered field 227, which is sensitive to relatively smaller corrosion due to the presence of the Doppler component 116, the EM scattered field 229 is sensitive to relatively larger corrosion on the outer casing 210.

Figure 3:
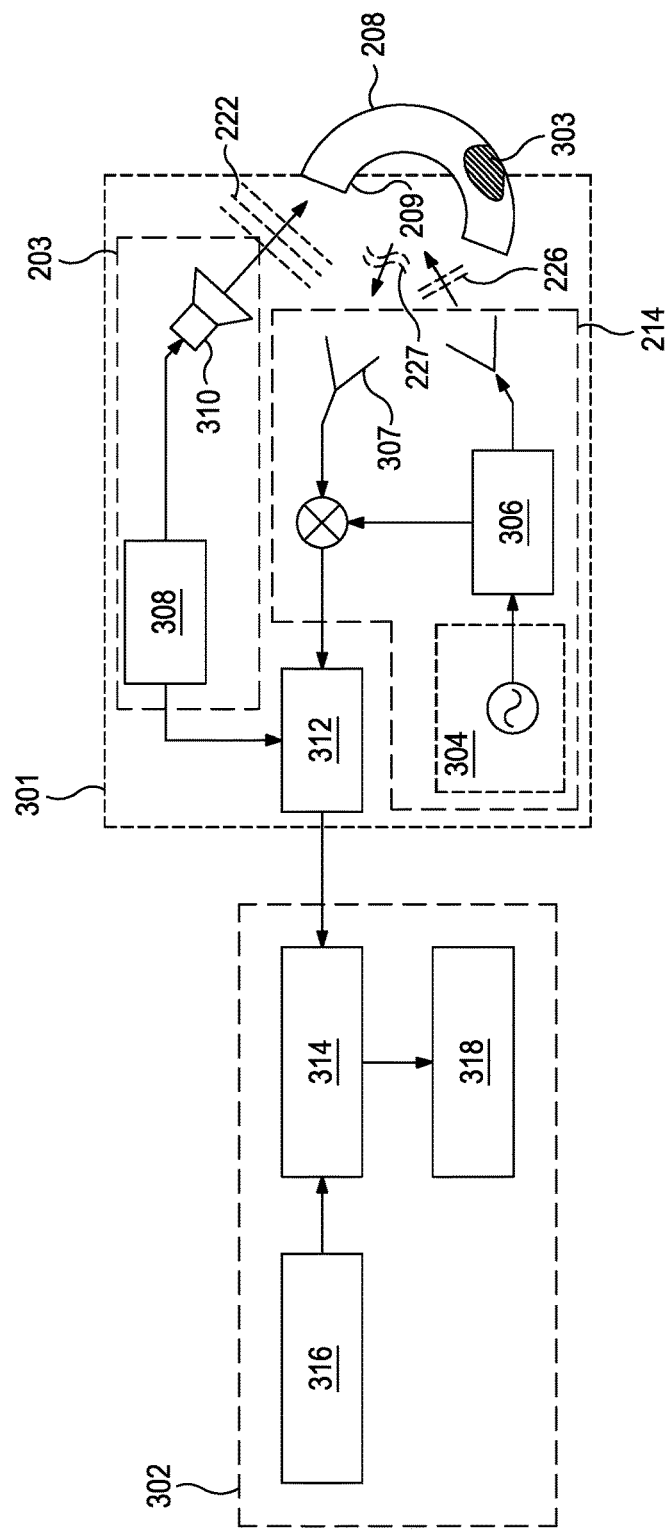
FIG. 3 illustrates an acousto-EM Doppler imaging and signal processing system used in the inspection system in FIG. 2.

FIG. 3 illustrates an acousto-EM Doppler (AED) imaging and signal processing system 300 that may be used in the inspection system 200 of FIG. 2. As illustrated, the system 300 includes an AED imaging component 301 and a signal processing component 302. The AED imaging component 301 (or at least a portion thereof) may be located on the rotating portion 202 (FIG. 2) of the tool 205 (FIG. 2). The signal processing component 302 may be located either in the rotating portion 202 or in the stationary portion 201 (FIG. 2) of the tool 205.

The AED imaging component 301 may include the high frequency EM energy transceiver 214. Alternatively or additionally, the AED imaging component 301 may include the transceiver 216. The AED imaging component 301 may further include one or both acoustic sources 203 and 204 (only 203 shown in FIG. 3), and a Doppler component detector 312. The transceiver 214 includes a high frequency electromagnetic (EM) source 304 (e.g., a local oscillator) that generates the high frequency EM waves 226. The EM waves 226 may be filtered using a filter 306, such as a band pass filter or any other type of filter known in the art. As illustrated, the EM waves 226 are incident on the inner surface 209 of the inner casing 208.

The inner casing 208 is vibrated at its resonant frequency using the acoustic wave 222 emitted from the acoustic source 203 (or 204, FIG. 2). The acoustic source 203 may include an acoustic energy generator 308 that may control an acoustic transducer 310 that generates the acoustic wave 222. The frequency of the acoustic wave 222 may be chosen such that the inner casing 208 vibrates at its acoustic resonant frequency. The acoustic resonant frequency of a casing may depend on the casing structure, shape, and size.

Due to the vibration of the inner casing 208, the scattered EM wave (or field) 227 (FIG. 2) is generated and is received by a receiver 307 included in the transceiver 214. The scattered EM wave 227 may be perturbed due to the presence of corrosion 303 on the inner casing 208. The scattered EM wave 227 may be referred to as being perturbed when the Doppler component 116 (FIG. 1B) of the scattered EM wave 227 shifts from its position (or value) at $f_{EM}+f_a$. Stated otherwise, the Doppler component 116 is shifted in frequency by a value more or less than the acoustic frequency $f_a$. The scattered EM wave 227 may be amplified and mixed down to baseband before being output to the Doppler component detector 312. The Doppler component (see FIG. 1B) is extracted from the scattered EM wave 227 using the Doppler component detector 312.

The signal processing component 302 may include a Time Reversal Focusing (TRF) module 314, a time domain forward modeling module 316, and a display module 318. The time domain forward modeling module 316 may provide a mathematical model of predicting the total scattered EM field (referred to as the reference EM fields) and the Doppler components of the casing 208 without corrosion when the borehole fluid 213 (FIG. 2) is known. The reference EM fields may be compared with the measured EM scattered field 227 to indicate the presence of corrosions in the casing 208. The extracted Doppler component is output to the TRF module 314, which may determine a position, size, and shape of the corrosion 303 present in the inner casing 208. The position, size, and shape of the corrosion 303 may be provided to the display module 318 and a high-resolution image of the corrosion may be generated and displayed.

In some examples, the AED imaging component 301 may also include a low frequency energy transceiver (not explicitly shown). For instance, one of the low frequency energy transceivers 218 or 220 (FIG. 2) may be included in the AED imaging component 301 in addition to the high frequency EM energy transceiver 214 (or 216). The low frequency energy transceivers 218 or 220 may operate in conjunction with the acoustic source 203 (or 204) and the Doppler component detector 312 of the AED imaging component 301. Alternatively, a separate acoustic source and Doppler component detector may be used with the low frequency energy transceivers 218 or 220. Each low frequency energy transceiver 218 and 220 may include a low frequency EM source (as opposed to the high frequency EM source 304 used in the high frequency EM energy transceivers 214 and 216). The low frequency EM source generates the low frequency EM waves 228 (FIG. 2) that are incident on the inner casing 208 and, at least a portion of which, traverse the inner casing 208 and are incident on the outer casing 210 (FIG. 2). The total scattered EM field 229 (FIG. 2) that is generated due to the interaction of the low frequency EM waves 228 with the inner casing 208 and/or the outer casing 210 is received by the low frequency energy transceiver 218 or 220. The total scattered EM field 229 may not include a Doppler component, or, alternatively, even if the Doppler component is present, a magnitude thereof may be relatively lower and may thus not be measurable. However, the total EM scattered field 229 still includes information based on which the time domain forward modeling module 316 can determine the presence of corrosion on the outer casing 210. As discussed above, the resulting image may have a lower resolution compared to the image obtained from the EM scattered field 227. As a result, the position, size, and shape of relatively larger corrosion on the outer casing 210 may be obtained from the image.

In other examples, because the acoustic source 203 (or 204) is used for generating a Doppler component, when no measurable Doppler component is present in the EM scattered field 229, the acoustic source 203 (or 204) may not be used when operating the low frequency energy transceivers 218 or 220. The EM scattered field 229 is provided to the signal processing component 302 for analysis and would still indicate the presence of any corrosion on the outer casing 210.

In some examples, the high frequency EM energy transceiver 214 (or 216) and the low frequency EM energy transceiver 218 (or 220) may be operated individually (e.g., in sequence).

Figure 4A:
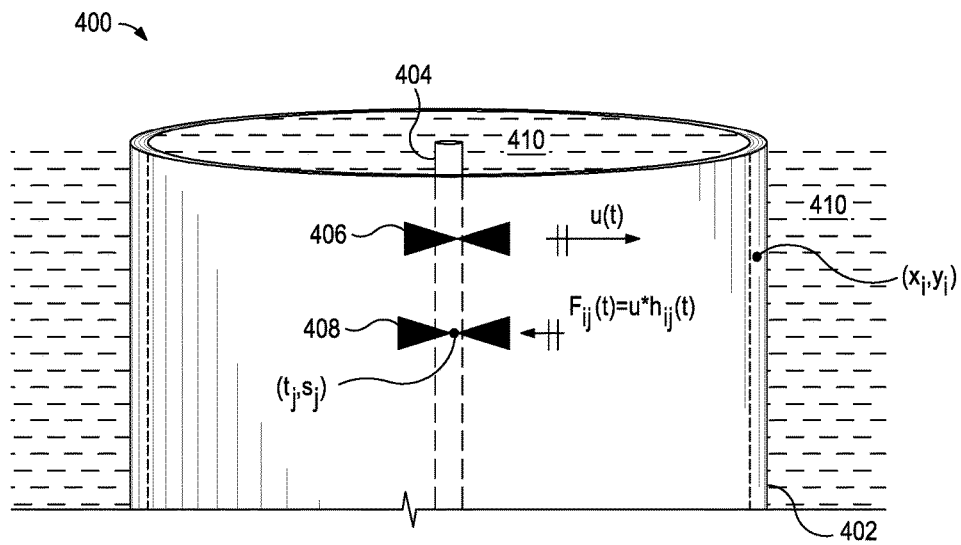
FIGS. 4A and 4B illustrate exemplary geometries of Time-reversal focusing using a single EM source.
Figure 4B:
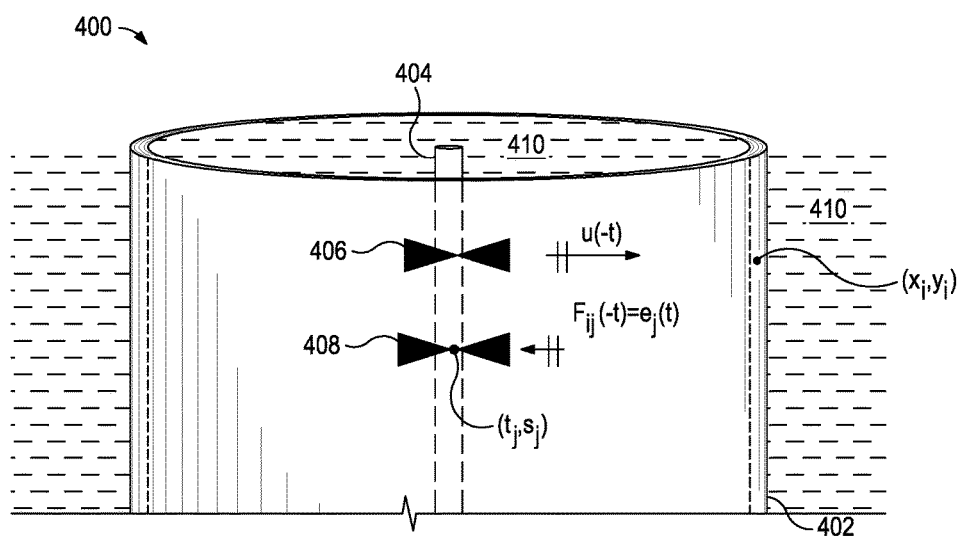
Figure 4C:
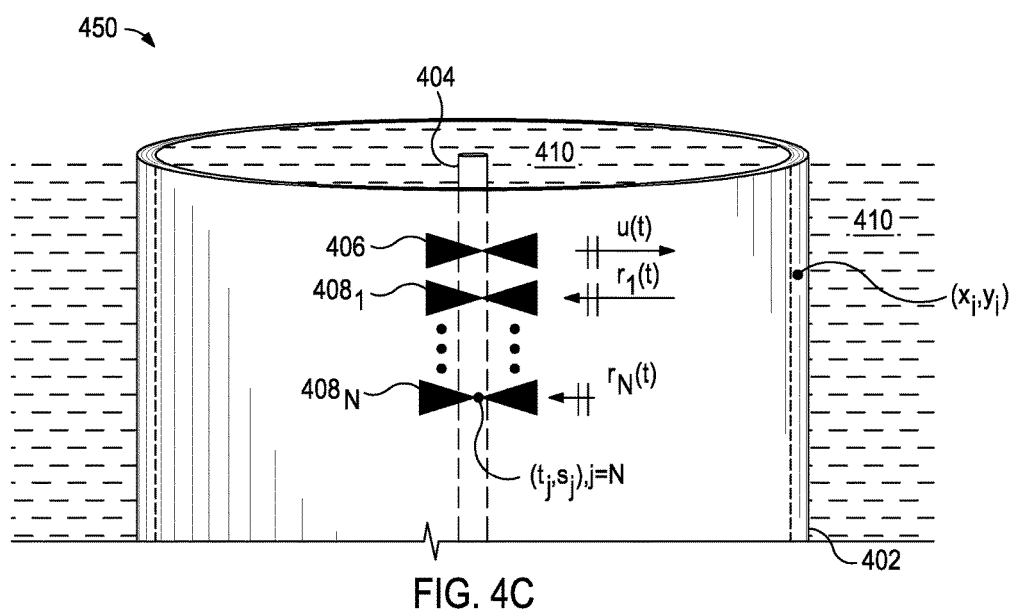
FIG. 4C illustrates an exemplary geometry of Time-reversal focusing using multiple EM sources.

Time reversal focusing (TRF) is used to process the Doppler component and the scattered EM field 229. Time-reversal focusing provides information about the corrosion location and its size and shape, and is based on reciprocity and invariance of the wave equation to change in the sign of the time variable. It should be noted that the TRF technique discussed below with respect to FIGS. 4A, 4B, and 4C is merely an example of different kinds of TRF techniques that may be used to process the scattered EM field 229, and, as such, example embodiments discussed herein are not restricted to a particular TRF technique. The TRF may be implemented in time domain or in frequency domain using, for example, the decomposition of time reversal operator (DORT). In other examples, qualitative non-iterative imaging methods, such as multiple signal classification (MUSIC) may be used instead of TRF.

FIGS. 4A and 4B illustrate exemplary geometries 400 of TRF using a single EM source. Depicted in FIGS. 4A and 4B is a casing 402, which may be either of the inner and outer casings 208 and 210 of FIG. 2. A downhole tool 404, which may be the downhole tool 205 of FIG. 2, is positioned inside the casing 402. The casing 402 may be exposed to any wellbore media, which in FIGS. 4A, 4B is shown as wellbore fluids 410. Referring to FIG. 4A, a signal u(t) is incident at a desired focal point $(x_i, y_i)$ on the casing 402. In an example, the signal u(t) is emitted from an EM source 406, which may be the EM source 304 (FIG. 3) included in any of the EM energy transceivers 214, 216, 218, and 220 (FIG. 2). The signal u(t) is reflected from the casing 402, and propagates through the media within the casing 402, and arrives at observation point $(t_j, s_j)$. In an example, the observation point $(t_j, s_j)$ may refer to an EM receiver 408, which may be the EM receiver 307 (FIG. 3) included in the EM energy transceiver 214, 216, 218, and 220. The received signal is denoted as $F_{ij}(t)$ and is the convolution of the input signal u(t) and the transfer function $h_{ij}(t)$ between the focal point $(x_i, y_i)$ and observation point $(t_j, s_j)$, and is represented as $F_{ij}(t) = u(t) * h_{ij}(t)$.

It should be noted that signal $F_{ij}(t)$ may contain the Doppler component generated due to the vibrating casing 402. The received signal $F_{ij}(t)$ is recorded at the observation point $(t_j, s_j)$ and is reversed in time. The observation point $(t_j, s_j)$ then become new source points and send out the time reversed received signal $F_{ij}(-t) = e_j(t)$, resulting in focusing at the focal point $(x_i, y_i)$. This is illustrated in FIG. 4B. The signal $e_j(t)$ propagates to the casing 402 and reconstructs a time reversed version of the original pulse, represented as u(-t), at the desired focal point $(x_i, y_i)$, which was the initial source point.

FIG. 4C illustrates an exemplary geometry 450 of TRF using multiple EM receivers $408_1, 408_2, \ldots 408_N$. The received signal at each observation point $(t_j, s_j)$ is denoted as $r_j(t), j=1, \ldots, N$ which includes the background field and the scattered field, for example, the Doppler component. It should be noted that, if the scattered field is a result of an inhomogeneity (e.g., corrosion) present at location i within the casing, then received signal $r_j(t)$ will have similar time dependence as the time reversed input signal u(-t), since this is the signal reconstructed at the focal point.

Considering the relationship between an equivalent volumetric source (casing corrosion) $J_v$ and an incident field $E_i$ given by $J_v = \in_0 (\in_r - 1) dE_i/dt$, where $\in_r$ is the complex dielectric constant of casing corrosion and $\in_0$ is the permittivity of free space. The correlation between received signals $r_j(t)$ and a reference signal given by $$dF_{ij} = \frac{du(-t)}{dt} * h_{ij}(t)$$

is the quantity of interest. A scattering intensity coefficient is defined as follows:

$$d_i(t) = \frac{\sum_{j=1}^{N} \int r_j(t) dF_{ij}(t) dt}{\sum_{j=1}^{N} \int (dF_{ij}(t))^2 dt}$$

where N is the number of observation points where the $r_j$ is recorded. The denominator represents a normalization factor.

The above processing results in a scattering intensity coefficient $d_i(t)$ measured at each focal point on the casing 402. The scattering intensity coefficient $d_i(t)$ indicates the correlation or similarity between return signal $r_j$ and the incident signal in the presence of casing corrosion at the focal point $(x_i, y_i)$. If there is casing corrosion at the focal point, the correlation will be high; the casing corrosion acts as a source, producing the same received signal at the observation points as the reference signal $dF_{ij}$. Under acoustic excitation, there is an increased displacement and straining surrounding casing corrosion and the Doppler component in received signals $r_j(t)$ has enhanced sensitivity to casing corrosion relative to casing alone. It should point out that received signals $r_j(t)$ can be or include either total scattered field without background casing subtraction or scattered field with background casing subtraction where the latter exhibits greater sensitivity to casing corrosion due to separation of the effect of inhomogeneity. Accordingly, using TRF, corrosion location is obtained by measuring the correlation between received signals and a reference signal.

Figure 5:
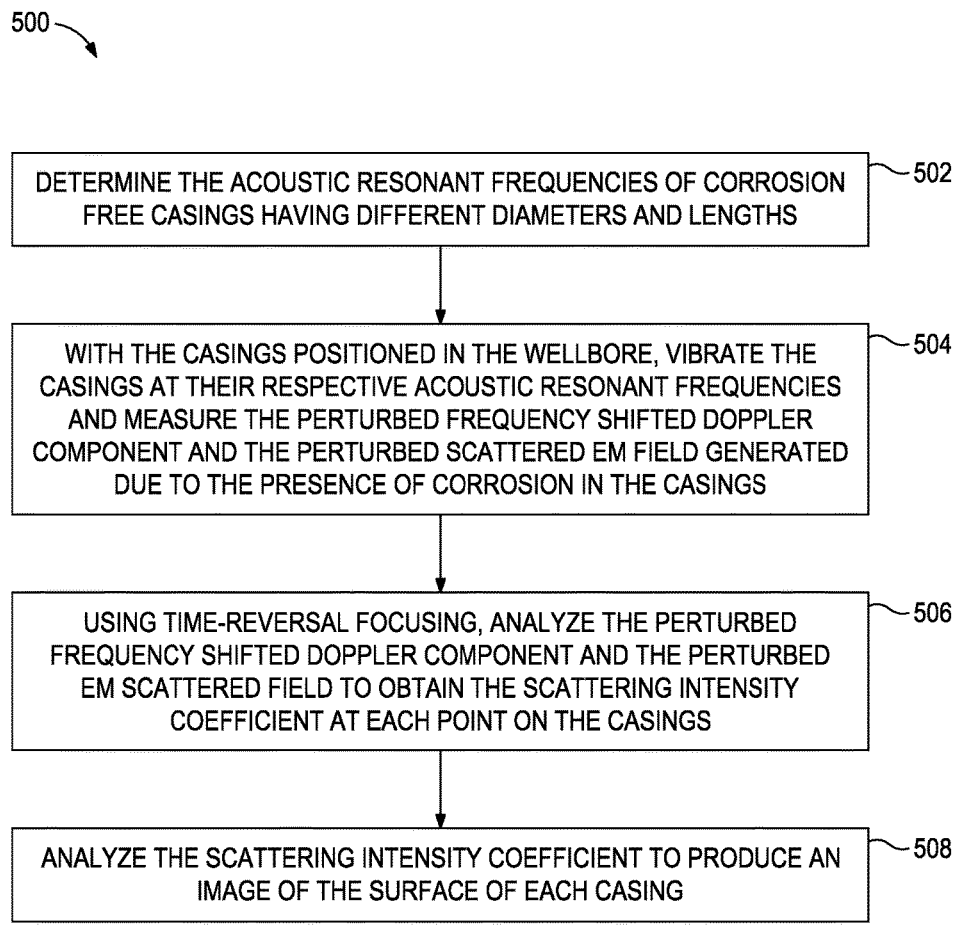
FIG. 5 illustrates an exemplary flowchart of a method of corrosion detection using the acousto-EM Doppler imaging and signal processing system of FIG. 3.

FIG. 5 illustrates an exemplary flowchart 500 of a method of corrosion detection using the acousto-EM Doppler (AED) imaging and signal processing system 300 of FIG. 3. At 502, the acoustic resonant frequencies of corrosion free casings having different diameters and lengths are initially determined. In an example, this process may be performed at a surface location where corrosion free inner and outer casings 208 and 210 (FIG. 2) may each be vibrated at different frequencies to determine the acoustic resonant frequency of each casing. Otherwise, the acoustic resonant frequencies of the corrosion free casings may be known based on known material properties. The scattered EM field, with or without Doppler component, that is generated due to the scattering of low frequency and high frequency EM waves from the vibrating casings 208 and 210 is then measured. The Doppler component and/or the scattered EM field of a corrosion free casing may be compared with the Doppler component and/or the scattered EM field obtained from a corroded casing in the wellbore (see below) and may thus indicate presence of corrosion.

At 504, with the casings positioned in the wellbore, the casings are vibrated at their respective acoustic resonant frequencies and the perturbed Doppler component and the perturbed scattered EM field generated due to the presence of corrosion in the casings are obtained. The casings may be vibrated using the acoustic source 203 (or 204) on the tool 205 and the measurements may be performed using the acousto-EM Doppler (AED) imaging and signal processing system 300 (FIG. 3) located on the tool 205.

At 506, the AED imaging and signal processing system 300 uses time-reversal focusing to analyze the perturbed frequency shifted Doppler component and the perturbed EM scattered field to obtain the scattering intensity coefficient at each point of the inner and outer casings 208 and 210. A high value of the scattering intensity coefficient at a point indicates the presence of corrosion at that point, and a low value of the scattering intensity coefficient at a point indicates absence of corrosion at that point.

At 508, based on the value of the scattering intensity coefficient, an image of the corrosion on the casing surface is displayed. The size, position, and shape of corrosion present in each casing is displayed in the image. The analysis provides high resolution images of the inner surface 209 (FIG. 2) of the inner casing 208 depicting the corrosion (size, shape, and position) and low resolution images of the inner surface 211 (FIG. 2) of the outer casing 210 depicting corrosion having a relatively larger size and shape (compared the size and shape of corrosion on the inner casing 208).

Figure 6:
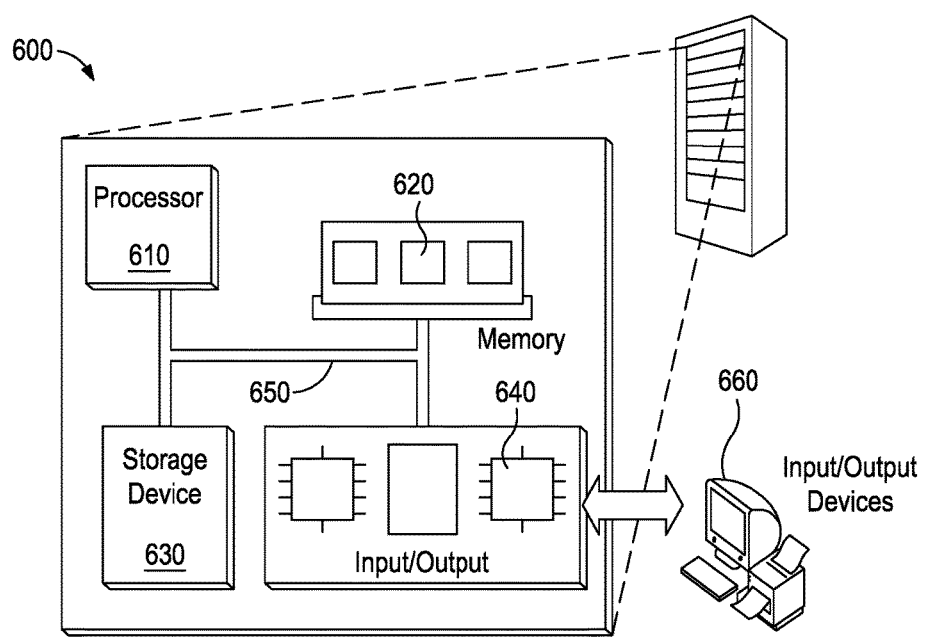
FIG. 6 shows an illustrative processing system for configuring and controlling the downhole tool of FIG. 2 and/or the acousto-EM Doppler imaging and signal processing system of FIG. 3 to inspect the casings for corrosion.

FIG. 6 shows an illustrative processing system 600 for configuring and controlling the downhole tool 205 and/or the acousto-EM Doppler (AED) imaging and signal processing system 300 to inspect the casings for corrosion. The system 600 may include a processor 610, a memory 620, a storage device 630, and an input/output device 640. Each of the components 610, 620, 630, and 640 may be interconnected, for example, using a system bus 650. The processor 610 may be processing instructions for execution within the system 600. In some embodiments, the processor 610 is a single-threaded processor, a multi-threaded processor, or another type of processor. The processor 610 may be capable of processing instructions stored in the memory 620 or on the storage device 630. The memory 620 and the storage device 630 can store information within the computer system 600.

The input/output device 640 may provide input/output operations for the system 600. In some embodiments, the input/output device 640 can include one or more network interface devices, e.g., an Ethernet card; a serial communication device, e.g., an RS-232 port; and/or a wireless interface device, e.g., an 802.11 card, a 3G wireless modem, or a 4G wireless modem. In some embodiments, the input/output device can include driver devices configured to receive input data and send output data to other input/output devices, e.g., keyboard, printer and display devices 660. In some embodiments, mobile computing devices, mobile communication devices, and other devices can be used.

In accordance with at least some embodiments, the disclosed methods and systems related to scanning and analyzing material may be implemented in digital electronic circuitry, or in computer software, firmware, or hardware, including the structures disclosed in this specification and their structural equivalents, or in combinations of one or more of them. Computer software may include, for example, one or more modules of instructions, encoded on computer-readable storage medium for execution by, or to control the operation of, a data processing apparatus. Examples of a computer-readable storage medium include non-transitory medium such as random access memory (RAM) devices, read only memory (ROM) devices, optical devices (e.g., CDs or DVDs), and disk drives.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative, or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be executed on one computer or on multiple computers that are located at one site or distributed across multiple sites and interconnected by a communication network.

Some of the processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors and processors of any kind of digital computer. Generally, a processor will receive instructions and data from a read-only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer may not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations may be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Embodiments disclosed herein include:

A. A method that includes introducing a tool into a wellbore lined at least partially with a first casing and a second casing concentrically overlapping a portion of the first casing, emitting an acoustic wave from an acoustic source included in the tool, the acoustic wave causing the first and second casings to vibrate at their respective resonant frequencies, emitting high frequency electromagnetic (EM) energy using the tool, the high frequency EM energy interacting with the first casing to generate a first EM scattered field, emitting low frequency EM energy using the tool, at least a portion of the low frequency EM energy traversing the first casing and interacting with the second casing to generate a second EM scattered field, and analyzing the first and second EM scattered fields to determine a presence of corrosion in at least one of the first and second casings.

B. A system that includes a tool conveyable into a wellbore lined at least partially with a first casing and a second casing concentrically overlapping a portion of the first casing, an acoustic source coupled to the tool to generate an acoustic wave, a high frequency electromagnetic (EM) transceiver coupled to the tool to generate high frequency EM energy that interacts with the first casing to generate a first EM scattered field, a low frequency EM transceiver coupled to the tool to generate low frequency EM energy that traverses the first casing and interacts with the second casing to generate a second EM scattered field, and a computer system including a processor and a non-transitory computer readable medium, the computer system being communicatively coupled to the tool and the computer readable medium storing a computer readable program code that when executed by the processor causes the computer system to actuate the acoustic source to generate the acoustic wave that interacts with the first and second casings and thereby causes the first and second casings to vibrate at their respective resonant frequencies, actuate the high frequency EM transceiver to generate the high frequency EM energy, actuate the low frequency EM transceiver to generate the low frequency EM energy, and analyze the first and second EM scattered fields to determine a presence of corrosion in at least one of the first and second casings.

Each of embodiments A and B may have one or more of the following additional elements in any combination: Element 1: wherein the high frequency EM energy is emitted using a high frequency EM transceiver included in the tool and the low frequency EM energy is emitted using a low frequency EM transceiver included in the tool, and the method further includes receiving at least a portion of the first EM scattered field using the high frequency EM transceiver, and receiving at least a portion of the second EM scattered field using the low frequency EM transceiver. Element 2: further including extracting a perturbed Doppler component from the first EM scattered field received by the high frequency EM transceiver, and determining the presence of corrosion in the first casing based on the perturbed Doppler component. Element 3: further including obtaining a model of the first casing, and determining at least one of a size, shape, and location of the corrosion present in the first casing using the model and the perturbed Doppler component. Element 4: further including positioning at least one of the acoustic source, the high frequency EM transceiver, and the low frequency EM transceiver on a rotating portion of the tool. Element 5: wherein at least one of the high frequency EM transceiver and the low frequency EM transceiver includes antennae, and the high frequency EM energy includes pulses in the microwave frequency and low frequency EM energy include pulses having a frequency around 10-1000 Hz. Element 6: wherein at least one of the high frequency EM transceiver and the low frequency EM transceiver includes an optical source, and the high frequency EM energy and low frequency EM energy includes laser pulses. Element 7: further including analyzing the first and second EM scattered fields using time reversal focusing. Element 8: further including determining the respective resonant frequencies of the first and second casings prior to positioning the first and second casings in the wellbore. Element 9: further including obtaining at least one of a Doppler component and a scattered EM field for each of the first and second casings prior to positioning the first and second casings in the wellbore. Element 10: wherein the presence of corrosion in the second casing results in a perturbed EM scattered field and the method further includes analyzing the perturbed EM scattered field to determine the presence of corrosion in the second casing. Element 11: further including obtaining a model of the second casing, and determining at least one of a size, shape, and location of the corrosion present in the second casing using the model and the perturbed EM scattered field.

Element 12: wherein executing the program code further causes the computer system to actuate the high frequency EM transceiver to receive at least a portion of the first EM scattered field, and actuate the low frequency EM transceiver to receive at least a portion of the second EM scattered field. Element 13: wherein executing the program code further causes the computer system to extract a perturbed Doppler component from the first EM scattered field received by the high frequency EM transceiver, and determine the presence of corrosion in the first casing based on the perturbed Doppler component. Element 14: wherein executing the program code further causes the computer system to obtain a model of the first casing, and determine at least one of a size, shape, and location of the corrosion present in the first casing using the model and the perturbed Doppler component. Element 15: wherein executing the program code further causes the computer system to analyze the first and second EM scattered fields using time-reversal focusing. Element 16: wherein executing the program code further causes the computer system to determine the respective resonant frequencies of the first and second casings prior to positioning the first and second casings in the wellbore. Element 17: wherein executing the program code further causes the computer system to obtain at least one of a Doppler component and a scattered EM field for each of the first and second casings prior to positioning the first and second casings in the wellbore. Element 18: wherein the presence of corrosion in the second casing results in a perturbed EM scattered field and wherein executing the program code further causes the computer system to analyze the perturbed EM scattered field to determine the presence of corrosion in the second casing. Element 19: wherein executing the program code further causes the computer system to obtain a model of the second casing, and determine at least one of a size, shape, and location of the corrosion present in the second casing using the model and the perturbed EM scattered field. Element 20: wherein executing the program code further causes the computer system to actuate at least one of the acoustic source, the high frequency EM transceiver, and the low frequency EM transceiver positioned on a rotating portion of the tool. Element 21: wherein at least one of the high frequency EM transceiver and the low frequency EM transceiver includes antennae and wherein executing the program code further causes the computer system to actuate at least one of the high frequency EM transceiver and the low frequency EM transceiver to emit the respective high frequency EM energy and low frequency EM energy including pulses in the microwave frequency range. Element 22: wherein at least one of the high frequency EM transceiver and the low frequency EM transceiver includes an optical source and wherein executing the program code further causes the computer system to actuate at least one of the high frequency EM transceiver and the low frequency EM transceiver to emit the respective high frequency EM energy and low frequency EM energy including laser pulses.

By way of non-limiting example, exemplary combinations applicable to A and B include: Element 1 with Element 2; Element 2 with Element 3; Element 1 with Element 4; Element 1 with Element 5; Element 1 with Element 6; Element 10 with Element 11; Element 13 with Element 14; and Element 18 with Element 19.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

What is claimed is:

1. A method, comprising:
   introducing a tool into a wellbore lined at least partially with a first casing and a second casing concentrically overlapping a portion of the first casing;
   emitting an acoustic wave from an acoustic source included in the tool, the acoustic wave causing the first and second casings to vibrate at their respective resonant frequencies;
   emitting high frequency electromagnetic (EM) energy using the tool, the high frequency EM energy interacting with the first casing to generate a first EM scattered field;
   emitting low frequency EM energy using the tool, at least a portion of the low frequency EM energy traversing the first casing and interacting with the second casing to generate a second EM scattered field; and analyzing the first and second EM scattered fields to determine a presence of corrosion in at least one of the first and second casings.

2. The method of claim 1, wherein the high frequency EM energy is emitted using a high frequency EM transceiver included in the tool and the low frequency EM energy is emitted using a low frequency EM transceiver included in the tool, and the method further comprises:
receiving at least a portion of the first EM scattered field using the high frequency EM transceiver; and
receiving at least a portion of the second EM scattered field using the low frequency EM transceiver.

3. The method of claim 2, further comprising:
extracting a perturbed Doppler component from the first EM scattered field received by the high frequency EM transceiver; and
determining the presence of corrosion in the first casing based on the perturbed Doppler component.

4. The method of claim 3, further comprising:
obtaining a model of the first casing; and
determining at least one of a size, shape, and location of the corrosion present in the first casing using the model and the perturbed Doppler component.

5. The method of claim 2, further comprising positioning at least one of the acoustic source, the high frequency EM transceiver, and the low frequency EM transceiver on a rotating portion of the tool.

6. The method of claim 2, wherein at least one of the high frequency EM transceiver and the low frequency EM transceiver includes antennae, and the high frequency EM energy includes pulses in the microwave frequency and low frequency EM energy include pulses having a frequency around 10-1000 Hz.

7. The method of claim 2, wherein at least one of the high frequency EM transceiver and the low frequency EM transceiver includes an optical source, and the high frequency EM energy and low frequency EM energy includes laser pulses.

8. The method of claim 1, further comprising analyzing the first and second EM scattered fields using time reversal focusing.

9. The method of claim 1, further comprising determining the respective resonant frequencies of the first and second casings prior to positioning the first and second casings in the wellbore.

10. The method of claim 1, further comprising obtaining at least one of a Doppler component and a scattered EM field for each of the first and second casings prior to positioning the first and second casings in the wellbore.

11. The method of claim 1, wherein the presence of corrosion in the second casing results in a perturbed EM scattered field and the method further comprises analyzing the perturbed EM scattered field to determine the presence of corrosion in the second casing.

12. The method of claim 11, further comprising:
obtaining a model of the second casing; and
determining at least one of a size, shape, and location of the corrosion present in the second casing using the model and the perturbed EM scattered field.

13. A system, comprising:
a tool conveyable into a wellbore lined at least partially with a first casing and a second casing concentrically overlapping a portion of the first casing;
an acoustic source coupled to the tool to generate an acoustic wave;
a high frequency electromagnetic (EM) transceiver coupled to the tool to generate high frequency EM energy that interacts with the first casing to generate a first EM scattered field;
a low frequency EM transceiver coupled to the tool to generate low frequency EM energy that traverses the first casing and interacts with the second casing to generate a second EM scattered field; and
a computer system including a processor and a non-transitory computer readable medium, the computer system being communicatively coupled to the tool and the computer readable medium storing a computer readable program code that when executed by the processor causes the computer system to:
actuate the acoustic source to generate the acoustic wave that interacts with the first and second casings and thereby causes the first and second casings to vibrate at their respective resonant frequencies;
actuate the high frequency EM transceiver to generate the high frequency EM energy;
actuate the low frequency EM transceiver to generate the low frequency EM energy; and
analyze the first and second EM scattered fields to determine a presence of corrosion in at least one of the first and second casings.

14. The system of claim 13, wherein executing the program code further causes the computer system to:
actuate the high frequency EM transceiver to receive at least a portion of the first EM scattered field; and
actuate the low frequency EM transceiver to receive at least a portion of the second EM scattered field.

15. The system of claim 14, wherein executing the program code further causes the computer system to extract a perturbed Doppler component from the first EM scattered field received by the high frequency EM transceiver, and determine the presence of corrosion in the first casing based on the perturbed Doppler component.

16. The system of claim 15, wherein executing the program code further causes the computer system to obtain a model of the first casing, and determine at least one of a size, shape, and location of the corrosion present in the first casing using the model and the perturbed Doppler component.

17. The system of claim 13, wherein executing the program code further causes the computer system to analyze the first and second EM scattered fields using time-reversal focusing.

18. The system of claim 13, wherein executing the program code further causes the computer system to determine the respective resonant frequencies of the first and second casings prior to positioning the first and second casings in the wellbore.

19. The system of claim 13, wherein executing the program code further causes the computer system to obtain at least one of a Doppler component and a scattered EM field for each of the first and second casings prior to positioning the first and second casings in the wellbore.

20. The system of claim 13, wherein the presence of corrosion in the second casing results in a perturbed EM scattered field and wherein executing the program code further causes the computer system to analyze the perturbed EM scattered field to determine the presence of corrosion in the second casing.

21. The system of claim 20, wherein executing the program code further causes the computer system to obtain a model of the second casing, and determine at least one of a size, shape, and location of the corrosion present in the second casing using the model and the perturbed EM scattered field.

22. The system of claim 13, wherein executing the program code further causes the computer system to actuate at least one of the acoustic source, the high frequency EM transceiver, and the low frequency EM transceiver positioned on a rotating portion of the tool.

23. The system of claim 13, wherein at least one of the high frequency EM transceiver and the low frequency EM transceiver includes antennae and wherein executing the program code further causes the computer system to actuate at least one of the high frequency EM transceiver and the low frequency EM transceiver to emit the respective high frequency EM energy and low frequency EM energy including pulses in the microwave frequency range.

24. The system of claim 13, wherein at least one of the high frequency EM transceiver and the low frequency EM transceiver includes an optical source and wherein executing the program code further causes the computer system to actuate at least one of the high frequency EM transceiver and the low frequency EM transceiver to emit the respective high frequency EM energy and low frequency EM energy including laser pulses.

* * * * *